Patented June 22, 1937

2,084,328

UNITED STATES PATENT OFFICE 2,084,328

GLASS BATCH AND PROCESS OF MAKING

Howard P. Eells, Jr., Willoughby, and Harvey N. Barrett, Tiffin, Ohio, assignors to Non-Metallic Minerals, Inc., Cleveland, Ohio, a corporation of Ohio No Drawing. Application March 4, 1935, Serial No. 9,286

14 Claims. (Cl. 106—36.1)

In the charging of glass furnaces, if the lime component in the batch be supplied in the form of raw limestone, the considerable volume of carbon dioxide gas which is disengaged in the melting is very objectionable. Efforts have been made to avoid this by supplying the lime in burned or calcined form. However, such calcined lime, being full of fines and inevitable dust, occasions much difficulty in its handling, the dust not only being highly irritating to workmen but incurring the further very serious objection of being carried off into the flues of the furnace and depositing there and choking them, thus at the same time occasioning a variation in the furnace charge by the amount of the loss of lime dust so carried away. Again, with certain kinds of flue lining, the temperature is sufficient to incur deterioration by reason of reaction of the lime dust upon the siliceous lining. In the batch itself there is again a very serious drawback in that calcined lime, including fines, is so much lighter than the glass sand component of the batch that segregation occurs, and it is very difficult to attain uniformity in the melt. A still further general objection to the use of calcined lime lies in its propensity to take up moisture from the atmosphere in transit and in handling, and this introduces a variable which continually militates against obtaining uniformity in batches, and this is particularly serious where glass compositions have to be run to close specifications. Furthermore, such calcined lime is so much lighter in gravity than the glass sand with which it must be mixed, that segregation tends to occur, and it is not easy to attain uniform melts, and besides, the porous lime may excessively introduce minute gas bubbles or "seeds", as they are termed in the art. Lime is in fact a notably difficult component to quickly and uniformly incorporate into glass. Alumina is likewise a difficult component to dissolve uniformly in a glass, and the incomplete solution and unhomogeneity produced by this constituent frequently results in "cords" in the glass. Alumina however, is a valuable component in many types of glass, and a practical method of easily incorporating it into glass is particularly desired.

In accordance with the present invention, it now becomes possible to prepare glass furnace charges without the difficulties noted, and in a manner particularly conducive to ease of handling and uniformity of result. Especially by improving the physical characteristics and by modifying the chemical nature of the lime constituent for a glass batch, it becomes possible to obtain easier vitrification and also introduce alumina into glass in a readily assimilable form.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

In the preparation of glass furnace charges in accordance with the invention, in addition to the glass sand, the lime is provided in a form from which the carbon dioxide has been eliminated, and particles of convenient size are had, with a specific gravity sufficiently near that of the sand component to make up therewith satisfactorily and not segregate out before melting is attained. For the preparation of the lime component, there is employed limestone of high calcium content or limestone containing more or less magnesia, (since magnesia is also particularly desirable in many cases), and which for convenience may be designated dolomite irrespective of whether the magnesium runs near molecular proportions to the calcium or is much less. In some instances limestone of both kinds may be employed. Impurities such as iron are kept down to a minimum, except in instances where the batch is for colored glass. The stone is crushed and screened to convenient size as ⅜ inch to 30 mesh, and for example may pass a ⅛ inch screen opening, and dust is removed. With this crushed stone there is then added a small amount of a flux, which for white glass must be substantially iron-free, and this flux is preferably of aluminous material. While aluminum mineral materials of high aluminum content may be used, feldspar clays or kaolin are particularly advantageous. For example, a relatively pure kaolin composed chiefly of alumina and silica and containing less than 1 per cent of iron is desirable. Clays or equivalent can be employed in the amount of 3 to 6 per cent. The clay or kaolin is ground to a reasonable fineness, for instance—100 mesh, preferably with sufficient water to form a slurry, and it is thoroughly mixed with the crushed stone. The mixture is then burned in a suitable kiln to clinker form, the final clinker retaining its discrete particle form, or if necessary to the extent that some of the particles have bonded together, the clinker may be broken down such that all will pass a mesh of convenient size, for instance 10 to 20 mesh. Burning may be accomplished in a periodic or stack kiln, with the material in briquet or dobie form if desired. The temperature of burning is such as to be sufficient to drive off the carbon dioxide and shrink the stone and flux and clinker it into densified dustless form. The burning temperatures may be on the order of 2500 to 2900° F. The clinker is finally mixed with the glass sand in the desired proportions, and any other special ingredients desired may be added, such as cullet, etc.

With the materials selected to be particularly low in iron, the lime may be prepared low in iron content, for instance less than 0.20 or even 0.10. The silica and alumina together need not exceed 8 per cent of the finished product.

As an example: Dolomite is crushed and screened to pass a ⅛ inch opening, particles finer than 20 mesh being eliminated. Indiana kaolin which after the moisture is driven off analyzes approximately 50 per cent silica and 50 per cent alumina, with iron a trace to about ½ per cent, is ground with water to a slurry, and is thoroughly mixed with the crushed stone in amount of 4 per cent of clay to 96 per cent stone. The mixture is fed into a rotary kiln and fired at a temperature of 2700° F., and a hard, dense granular product is obtained which is sized to pass a 20 mesh screen. This lime component is finally mixed with the other constituents which may vary, depending upon the precise use intended for the glass, and which for instance in a batch for machine-made bottles may involve sand 1000 parts by weight, soda ash 375 parts, and the fluxed lime 115 parts. In similar manner where a high calcium source of lime is desired, the high calcium limestone may be crushed and sized to convenient mesh, as —6 to +40, and in suitable proportions as 95-97 per cent to 3-5 per cent of kaolin, be fired to a dense clinker and be mixed with the sand and soda ash etc. to make up the batch, as above illustrated. Portions of high calcium clinker and dolomite clinker may both be used for the batch where desired, also optional ingredients such as feldspar, carbon, arsenic, etc.

The lime component in such fluxed clinkered form is not only thus highly uniform in character by reason of its freedom from tendency to take up moisture from the air, but it is advantageous as regards its chemical properties and its handling and mixing properties, irritating dust being absent and corresponding detriment to the furnace flues, and the specific gravity of the shrunk densified clinker particles is such as to readily maintain mixture with the sand component of the charge. On account of its resistant character on atmospheric exposure, thus also readily lends itself to storage and variations in requirements as regards mixing of the glass batches, without deterioration even though circumstances require its exposure to atmospheric conditions for weeks or months before being charged to the furnace.

Other modes of applying the principle of the invention may be employed, change being made as regards the details described, provided the features stated in any of the following claims, or the equivalent of such, be employed.

We therefore particularly point out and distinctly claim as our invention:—

1. A glass furnace charge, comprising silica, soda, and a lime component, part at least of said lime component embodying the reaction product of a limestone calcined with an aluminous flux.

2. A glass furnace charge, comprising silica, soda, and a lime component, part at least of said lime component embodying the reaction product of a limestone calcined with an aluminous flux at a temperature in excess of 2500° F.

3. A glass furnace charge, comprising silica, soda, and a lime component, part at least of said lime component embodying the reaction product of a limestone calcined with a clay.

4. A glass furnace charge, comprising silica, soda, and a lime component, part at least of said lime component embodying the reaction product of a limestone calcined with a clay containing less than 1 per cent of iron oxide.

5. A glass furnace charge, comprising silica, soda, and a lime component, part at least of said lime component embodying the reaction product of a limestone calcined with 3 to 6 per cent of kaolin containing less than 1 per cent of iron oxide.

6. A glass furnace charge, comprising silica, soda, and a lime component, part at least of said lime component embodying the reaction product of dolomite calcined with an aluminous flux.

7. A glass furnace charge, comprising silica, soda, and a lime component, part at least of said lime component embodying the reaction product of dolomite calcined with an aluminous flux at a temperature in excess of 2500° F.

8. A glass furnace charge, comprising silica, soda, and a lime component, part at least of said lime component embodying the reaction product of dolomite calcined with a clay.

9. A glass furnace charge, comprising silica, soda, and a lime component, part at least of said lime component embodying the reaction product of dolomite calcined with a clay containing less than 1 per cent of iron oxide.

10. A glass furnace charge, comprising silica, soda, and a lime component, part at least of said lime component embodying the reaction product of dolomite calcined with 3 to 6 per cent kaolin containing less than 1 per cent of iron oxide.

11. A process of making a glass furnace charge by calcining a limestone with an aluminous flux, and mixing the calcined product with sand and soda.

12. A process of making a glass furnace charge by calcining a limestone with an aluminous flux at a temperature in excess of 2500° F. and mixing the calcined product with sand and soda.

13. A process of making a glass furnace charge by calcining dolomite with an aluminous flux, and mixing the calcined product with sand and soda.

14. A process of making a glass furnace charge by calcining dolomite with an aluminous flux at a temperature in excess of 2500° F. and mixing the calcined product with sand and soda.

HOWARD P. EELLS, Jr.
HARVEY N. BARRETT.